Patented Oct. 11, 1938

2,132,665

UNITED STATES PATENT OFFICE 2,132,665

MORTICIAN'S SEALING COMPOUND

Floyd E. Williams, Gary, Ind., assignor to Marbon Corporation, Chicago, Ill., a corporation of Delaware No Drawing. Application June 17, 1936,
Serial No. 85,695

1 Claim. (Cl. 27—21)

This invention relates to a composition of matter particularly adapted for mortician's sealing fluid.

In the process of embalming a body it becomes necessary to make certain incisions as is the case when post mortems are performed. In closing these incisions the common procedure is to sew them with needle and thread. This practice is used also where bodies are mutilated. The body contains a great proportion of water and in the course of embalming additional preservative fluids are injected arterially. Through the process of osmosis the muscles and the tissues become saturated with fluids, therefore, it becomes necessary to make a tight seal where incisions are made to stop the flow of fluids that would not only create an odor but ruin clothing with which it came in contact.

Hitherto various materials have been used for this purpose, among them being nitrocellulose compositions. However, all these materials possess certain disadvantages such as brittleness, poor water resistance, inability to stretch and flex, weakness, etc., which are at least in part overcome by the composition of this invention.

I have found that rubber hydrochloride has the strength, flexibility and resistance to water and chemicals which make it particularly advantageous as a mortician's adhesive fluid. Unlike many film forming materials it will stretch to a high degree without breaking and has high strength. Water and the chemicals such as formaldehyde, phenol, alcohol, boracic acid, acetic acid and glycerine, commonly used by morticians, have little or no effect on rubber hydrochloride.

The following example will illustrate my invention:

Rubber hydrochloride (amorphous
  asymmetrical) _____ 100
Magnesium oxide _____ 30
Hexamethylene tetramine _____ 2
Rayox ($TiO_2$) _____ 2
Petrol red dye _____ .015 are milled together about twenty minutes and refined (sheeted thin) several times in order to produce a uniform flesh colored composition. This composition is then dispersed in a volatile solvent in a proportion to form a 15% by weight dispersion having a specific gravity of about 1.33. I prefer a non-inflammable solvent and have found that the 25% carbon tetrachloride 75% ethylene dichloride solution known to the trade as Chlorosol is particularly satisfactory.

It is to be understood that variations may be made in the formula without departing from the spirit of this invention. The coloring matter is of such a type and combined in such proportion as to produce a flesh colored film. I prefer to combine a white pigment such as rayox or whiting with a red dye to give the proper shade. The magnesium oxide and hexamethylene tetramine act as stabilizers and ant-acids. Other stabilizers and ant-acids may be used, or they may be omitted with less satisfactory results.

I claim:

A fluid for use as a skin seal which has approximately the following composition, the proportions being in parts by weight:
Amorphous rubber hydrochloride _____ 100
Magnesium oxide _____ 30
Hexamethylene tetramine _____ 2
Titanium dioxide _____ 2
Oil soluble red dye _____ .015
Volatile solvent for rubber hydrochloride
  in amount to form approximately a
  15% by weight dispersion.

FLOYD E. WILLIAMS.